Patented Jan. 1, 1946

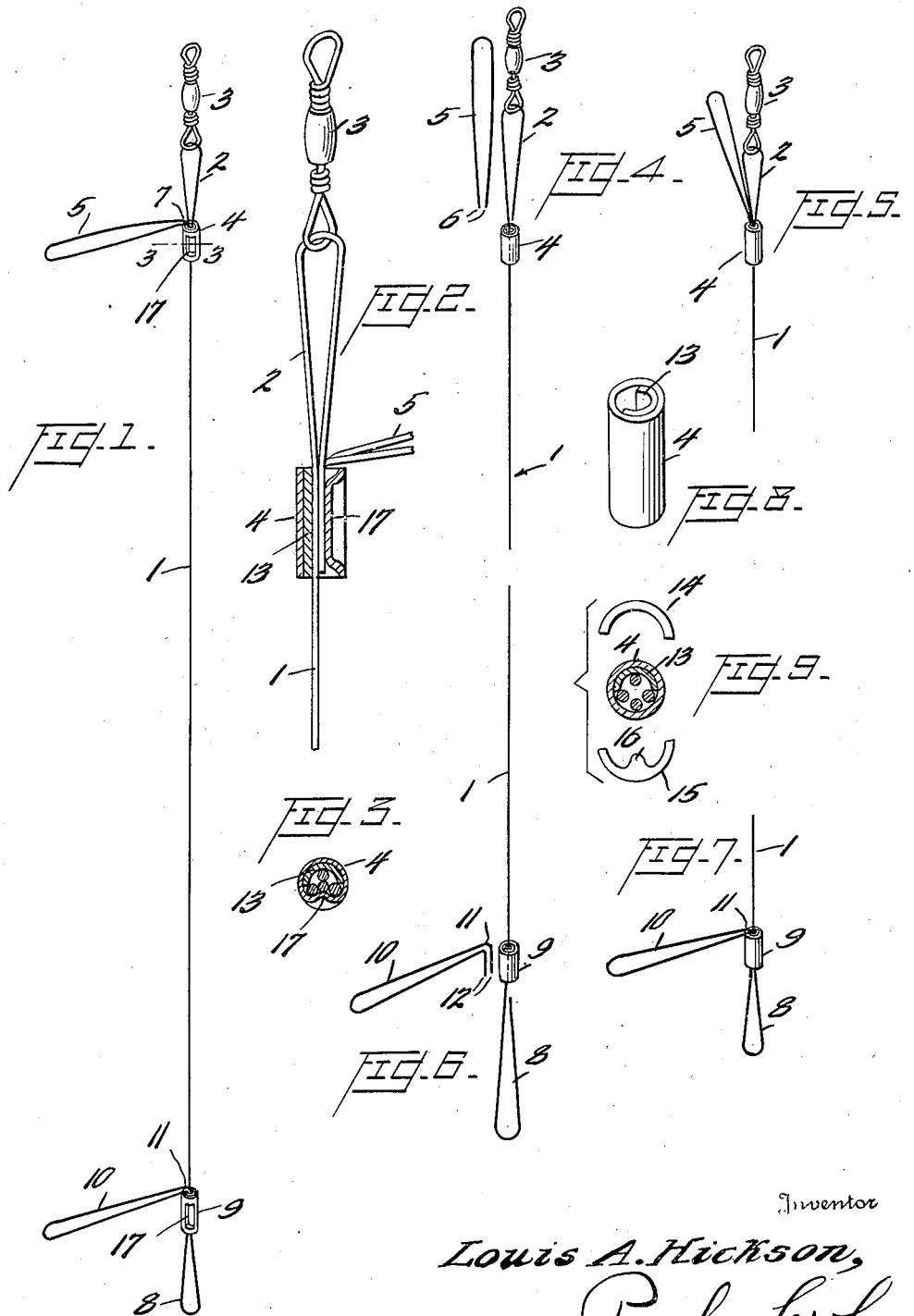

2,392,147

UNITED STATES PATENT OFFICE 2,392,147

FISHING RIG OR LEADER

Louis A. Hickson, Philadelphia, Pa.

Application November 1, 1944, Serial No. 561,421

3 Claims. (Cl. 43—28)

My invention relates to new and useful improvements in a fishing rig or leader and has for an object to provide a fishing rig or leader to which may be quickly and easily attached two hooks and a sinker or, as it is more commonly known along the Jersey Coast, the dipsy.

Still another object of the invention is to provide a rig or leader consisting of one long strand of wire which is provided with a vertical supporting loop at its upper end which is passed through a swivel to which the fishing line is secured, and likewise a loop at its lower end to which is to be secured a sinker or dipsy. Extending horizontally or perpendicularly to the main strand are the upper and lower loops to which the leaders of the two respective hooks are to be secured.

As is well known to fishermen and especially along the Atlantic Coast, two hooks are generally employed. In the first place, when fishing from docks, piers, bridges or boats there is generally a small hook fastened to the rig to catch the bottom fish such as flounder, fluke, king fish, etc., or in other words, bottom feeders, while placed two or three feet above this hook is what is known as the upper hook which is generally much larger in size, and this hook will attract when baited the fish that swim above the bottom.

Also, the smaller hook is generally used in surf fishing, one hook being large and one being small, since although they both lie on the bottom, the smaller fish, as just above mentioned, will take the small hook and the small bait rather than the large hook and the large bait.

Again, if the fish are plentiful there is always a possibility of getting the two fish at the same time.

Another one of the objects of the present invention is to provide a rig that will last indefinitely due to the way in which it is made, and due to the fact that it is made of a rustless or stainless steel and will probably be lost when the fisherman backlashes in casting rather than by the same wearing out.

Still another object of the invention is to provide a rig that may be quickly made or assembled with but little effort and after once made will never pull apart or break as the heaviest line frequently used is around 27 to 36 pounds wet test while the rig about to be described will withstand a strain several times as great.

Still another object of the invention is to provide a rig wherein the rig consists of one metal strand and two smaller pieces that are bent to loop formation, together with two compressible collars that crimp the loops to the main metal strand and these two collars also respectively hold the free ends of the upper and lower vertically extending loops of the main strand.

Still another object of the invention is to provide a rig wherein after the main strand is cut to length and the two short pieces are cut to length and bent, it is but a matter of minutes to bind and crimp the parts together as will be hereinafter shortly described.

Still another object of the invention is to provide a metal leader or rig on which there is the upper loop to which will be secured the swivel and fishing line, and the lower loop to which will be secured the sinker. Also, there will be two additional loops, one for supporting an upper and one supporting the lower hook. These upper and lower loops are in turn made secure in two respective collars, which collars are crimped in position rather than soldered, so that in the assembling of the rig, time that would be ordinarily lost by the soldering operation is thus saved.

With these and other objects in view the invention consists in certain new arrangements and combination of parts as will be hereinafter more fully described and pointed out in the claims.

Referring now to the drawing showing a preferred embodiment:

Fig. 1 is a view and elevation showing the completed rig or leader to receive the two hooks and sinker;

Fig. 2 is an enlarged view of the upper end of the strand and its collar, the collar being in section to show the manner in which the upper horizontal loop and free end of the vertical loop are clamped into position;

Fig. 3 is a fragmentary detailed sectional view showing the collar as having been crimped to hold the different strands of the wire of the rig in place;

Fig. 4 is a view of the upper end of the main strand together with its vertical loop before being threaded in the collar, and the additional piece of wire bent in loop form also before being clamped within the collar;

Fig. 5 shows the free end of the vertical loop and horizontal loop with their free ends now within the collar and the collar about to be deformed;

Fig. 6 is a smaller view of the lower end of the strand showing the parts before being placed in the lower collar;

Fig. 7 is a view similar to Fig. 6 showing the parts within the collar just before crimping;

Fig. 8 is a perspective of the collar; and

Fig. 9 shows the collar with the strands within the collar and the upper and lower nose of a plier for deforming the collar.

Referring now more particularly to the several views and for the moment to Fig. 1, there is shown the completed rig to which the line, hooks and sinker are to be attached.

The method followed out in making the rig is as follows:

First, the main strand of a relatively thin stainless steel wire 1 is cut to desired length and generally this is between two and three feet long. A collar 4 is then slipped over one end of the wire and with the hands the upper end of the wire is formed into a loop 2 and the free end is passed through the collar 4.

In Fig. 4, for the purpose of illustration, I have shown the free end of the loop 2 before it is passed into the collar. In reality, rather than making the small loop as shown in 2, a relatively large loop is made by bending the wire with the hands, the loop being some six or seven inches in diameter. The free end of the loop is then passed within the collar after the swivel 3 is in place and then with a pair of pliers, the collar with the free end of this big loop therein is moved towards the loop and the big loop gradually decreases in size until it is of the desired size.

Due to the angle that the free end of loop enters into the collar, the free end of the loop does not slip up through the collar, as might be thought, but travels with the collar as the loop is decreased in size.

The purpose of making the loop this way is that it is but a matter of a moment to make a big loop, fit the free end into the collar and then slip the collar towards the loop, whereas if the little loop were made by hand of the right size to start with, it would take considerably more time.

After the loop is of the desired size as shown in Fig. 5, the small pre-formed loop 5 will have its free end 6 also passed within the collar 4.

The collar 4 has a small semicircular liner 13 as may be seen in Fig. 8 and after the loop 5 and the loop 2 are in position, the collar is crimped within the jaws of a plier as shown in Fig. 9. That is, the pliers have a semicircular socket in the one nose and a male die 15 with the nose 16, and the collar is then squeezed until it assumes the shape shown in Figs. 2 and 3. This deforming of the metal of the collar tightly clamps the free end of the loop 2 and the free ends of the loop 5 so that any strain to which the rig will ever be subjected will not pull them apart.

The loop 5, after having its free end clamped within the collar, may be now bent from the angular position shown in Fig. 5 to the position shown in Fig. 1.

In the same way a collar 9 is slipped over the free end of the wire 1 and a large loop 8 formed. The free end is then passed within the collar and the collar pulled downwardly with the free end of the loop still within the collar. After the loop of the desired size is formed, an additional piece of wire—which is pre-bent to loop form and bent downwardly at 11 to form the right angular projections 12—is placed within the collar (the right angular projections 12) after which the collar with these several ends will be deformed as at 17. Thus it will be seen that the strands of the upper loop will be tightly gripped within the upper collar and its interliner, and the lower loops will be held in the lower collar.

In the completed rig, therefore, we have the main strand 1 with the vertical loop 2 with its swivel 3 and we also have the horizontally extending loop 5 to the upper end of which the gut leader of a hook (not shown) will be secured.

In the same way, there is the lower loop 10 to which the gut leader of a smaller size hook may be fastened, while to the main loop 8 may be tied or fastened the desired size sinker or dipsy.

I have not shown the hooks in place but it will be understood that the most popular hook is one provided with a gut leader of about one foot in length and this gut leader has an eyelet on its free end. Therefore, it is but a matter of a moment to put the eyelet of the gut leader (not shown) through the metal loop 5 and/or 10 and then feed the hook back through the eyelet of the gut leader to thus securely fasten the hook in place.

In the same way, it is but a matter of a moment to take off the hooks from the rig if one is broken or it is desired to put on different size hooks.

From the foregoing it will be seen that I have provided a method for making up a rig wherein the several pieces of wire employed may be all cut to length beforehand and shaped, and it is but a matter of a moment to slide the upper collar over the free end of the horizontal loop and then insert the free ends of the vertical supporting loop, and then clench all the free ends in position, and in the same way, clench the free ends of the lower loop that supports the hook and the free end of the loop that supports the sinker and then deform the collar to thus complete the rig.

As heretofore mentioned, the rig will never break before the line and due to being made of rustproof material it should last indefinitely.

It will also be seen that by employing the method outlined, the rig may be assembled in a relatively short time as all soldering is dispensed with.

Also, the rig might be made up to accommodate just one hook or even additional loops might be added, but the conventional rig most universally used is one employing two hooks.

Again, there is an advantage in having a wire leader for, if the fish rolls, his spine cannot cut the leader, whereas it might cut the linen line.

Many slight changes might be made without in any way departing from the spirit or scope of the invention.

Having thus described my invention what I claim as new and desire to secure by Letters Patent is:

1. A fishing rig including a main wire, a main supporting loop at the upper extremity of the wire, a loop at the lower extremity of the wire, a deformable sleeve near the lower extremity of the wire and a part of the lower loop extending within the sleeve, a further loop formed of a separate piece of wire and having its free ends also extending within the sleeve and the said last mentioned loop extending at an angle to the main wire, the said sleeve deformed about the main wire, the lowermost loop and the free ends of the angularly positioned loop to thus tightly hold the two bottom loops and the main wire in a set position.

2. A fishing rig including a main wire, a loop formed at the upper end of the wire and a swivel secured in said loop, a collar on the main wire and deformed about the main wire and the free end of said loop to thus hold the loop in its formed position, a further collar near the lower end of the wire, a bottom loop having its free end extending within said last mentioned collar, a hook-supporting loop formed of a separate piece of wire and having its free ends also extending within the last mentioned collar, the last mentioned loop extending at an angle to the main wire, the last mentioned collar also deformed about the main wire, the free end of the bottom loop and the free ends of the angularly positioned loop to thus tightly hold the free ends mentioned in a set position.

3. A fishing rig including a main wire, a loop formed at the upper end of the wire and a swivel secured in said loop, a collar on the main wire and the free end of said loop extending within said collar, an additional wire bent to form a loop for securing a top hook, and the free ends of said loop also extending within said collar and said collar deformed about the three said free ends to hold the same in a set position; a further collar near the lower end of the wire, a bottom loop having its free end extending within said further collar, a bottom hook-supporting loop formed of a separate piece of wire and likewise having its free ends also extending within said further collar, the last mentioned loop extending at an angle to the main wire, the last mentioned collar also deformed about the main wire, the free end of the bottom loop and the free ends of the angularly positioned loop to thus tightly hold the said last mentioned free ends in a set position.

LOUIS A. HICKSON.